United States Patent
Casavant et al.

(10) Patent No.: US 9,422,824 B2
(45) Date of Patent: *Aug. 23, 2016

(54) GAS TURBINE THERMAL CONTROL AND RELATED METHOD

(71) Applicant: General Electric Company, Schenectady, NY (US)

(72) Inventors: Matthew Stephen Casavant, Greenville, SC (US); Kenneth Damon Black, Travelers Rest, SC (US); David Martin Johnson, Simpsonville, SC (US); Radu Ioan Danescu, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 920 days.

This patent is subject to a terminal disclaimer.

(21) Appl. No.: 13/654,689

(22) Filed: Oct. 18, 2012

(65) Prior Publication Data

US 2014/0109590 A1 Apr. 24, 2014

(51) Int. Cl.
| | |
|---|---|
| *F01D 11/24* | (2006.01) |
| *F01D 11/16* | (2006.01) |
| *F01D 11/02* | (2006.01) |
| *F01D 11/18* | (2006.01) |
| *F01D 11/20* | (2006.01) |
| *F01D 11/14* | (2006.01) |

(52) U.S. Cl.
CPC .............. *F01D 11/24* (2013.01); *F01D 11/025* (2013.01); *F01D 11/14* (2013.01); *F01D 11/16* (2013.01); *F01D 11/18* (2013.01); *F01D 11/20* (2013.01)

(58) Field of Classification Search
CPC .......... F02C 6/08; F02C 9/18; F01D 11/025; F01D 11/14; F01D 11/16; F01D 11/18; F01D 11/20; F01D 11/24
See application file for complete search history.

(56) References Cited

U.S. PATENT DOCUMENTS

| | | | |
|---|---|---|---|
| 3,966,354 A | * | 6/1976 | Patterson ............... F01D 11/18 415/116 |
| 4,292,801 A | | 10/1981 | Wilkes et al. |
| 4,833,878 A | | 5/1989 | Sood et al. |
| 5,116,199 A | | 5/1992 | Ciokajlo |
| 5,281,085 A | | 1/1994 | Lenahan et al. |
| 5,779,436 A | * | 7/1998 | Glezer .................... F01D 11/24 415/115 |
| 5,819,525 A | | 10/1998 | Gaul et al. |
| 6,126,390 A | | 10/2000 | Böck |
| 7,086,233 B2 | | 8/2006 | Chehab et al. |
| 7,104,751 B2 | | 9/2006 | Naik et al. |
| 7,690,885 B2 | | 4/2010 | Lee et al. |
| 7,811,054 B2 | | 10/2010 | Eastman et al. |
| 7,914,254 B2 | | 3/2011 | Erickson et al. |
| 8,021,109 B2 | | 9/2011 | Kneeland et al. |
| 8,123,406 B2 | | 2/2012 | Erickson et al. |

(Continued)

*Primary Examiner* — Gerald L Sung
*Assistant Examiner* — Scott Walthour
(74) *Attorney, Agent, or Firm* — Dority & Manning, PA

(57) ABSTRACT

Thermal control is provided for a gas turbine casing by supplying thermal control gas from a compressor to a space between an outer casing and an inner casing, and transferring the thermal control gas from the space through the opening in the inner casing via a plurality of holes defined through a plate attached to an outer surface of the inner casing. The holes are arranged with a predetermined non-uniform distribution corresponding to a desired preferential impingement pattern for providing non-uniform heat transfer. A gas turbine thermal control assembly includes structure providing preferential heat transfer from the inner casing during operation of the gas turbine via a thermal control gas flow path from radially outside of the inner casing into the interior of the gas turbine.

10 Claims, 5 Drawing Sheets

(56) References Cited

U.S. PATENT DOCUMENTS

| | | | |
|---|---|---|---|
| 9,238,971 B2* | 1/2016 | Casavant | F01D 11/24 |
| 2008/0089780 A1 | 4/2008 | Erickson et al. | |
| 2008/0131263 A1* | 6/2008 | Lee | F01D 11/08 |
| | | | 415/115 |
| 2009/0068007 A1 | 3/2009 | Erickson et al. | |
| 2010/0074745 A1* | 3/2010 | Jones | F01D 11/24 |
| | | | 415/209.3 |
| 2010/0266393 A1 | 10/2010 | Saroi | |
| 2011/0079021 A1 | 4/2011 | Maldonado | |
| 2012/0093639 A1 | 4/2012 | Ballard, Jr. et al. | |
| 2012/0093641 A1 | 4/2012 | Chieco | |

* cited by examiner

GAS TURBINE THERMAL CONTROL AND RELATED METHOD

FIELD OF THE INVENTION

The subject matter disclosed herein relates to thermal control methods for gas turbine casings and gas turbine casing assemblies with thermal control properties.

BACKGROUND OF THE INVENTION

In gas turbines, maintaining a desired radial clearance between the tips of the rotating blades of the turbine (sometimes called "buckets") and the facing interior surfaces of the casing is important to performance of the turbine and endurance of the parts. The radial clearance can vary, for example, during transient operation such as start up or stoppage when rotational speed is changing. Also, temperature differences can have an effect on the clearance, not only during such transient operation as individual components are experiencing temperature change, but also during steady state operation as substantial heat is transferred to the turbine section casing internally by hot gas flowing from the combustor section. Casings are commonly constructed from multiple, somewhat non-uniform, arcuate portions arranged circumferentially around the turbine section and attached together, for example, at flanged edges. Accordingly, the circumferentially non-uniform configuration leads to an uneven thermal response around the casing, and non-roundness and local stress concentration can occur as the temperature of the casing changes.

Various strategies have been used be used to control the tip/casing clearance. For example, in some gas turbines, air impingement cooling is used on the outside of the turbine casing to remove heat from the casing, thereby maintaining a more uniform temperature distribution. In such systems an external blower supplies ambient air to manifolds distributed around the casing. Use of such systems incurs capital and operational costs, and also impacts net turbine efficiency.

Achieving a relatively uniform and suitably high heat transfer coefficient across the large, non-uniform, non-standard casing surfaces can be a challenge using such external air impingement. Accordingly, adjustable mounts have been proposed for fine tuning the distance between the casing outer surface and the opposing manifold plate. U.S. Pat. No. 8,123,406 discloses such an adjustable manifold system.

To achieve high heat transfer rates, some gas turbines use manifold plates facing the casing with many small air outlet holes and short nozzle to surface distances. Use of such relatively small impingement cooling holes correspondingly dictates a relatively high differential pressure drop across the holes, thereby requiring cooling air supplied at a higher pressure. Consequently, a higher pressure blower may be needed adding further capital and operational cost, and further negative impact on gas turbine net efficiency. Also, external blowers of the types above can only provide air to the casing at or near room temperature, whereas heating (rather than cooling) of the casing might be desired during some operation conditions. For example, during start up as the mass of the casing is cool and the buckets begin rotating in the hot combustor flow, the tip clearance may be smaller than desired, or the tips may even undesirably contact the inner casing or a shroud element on the inner casing.

In some systems, gas is extracted from the compressor section to cool portions of the turbine section. U.S. Pat. No. 7,690,885 discloses a gas turbine with such compressor gas extraction. Extracted cooling gas passes through plenums and baffles attached to a shroud support, arranged radially outward of a shroud that surrounds the rotating blades or the turbine, to cool the shroud's outer surface. The gas then follows different paths through the shroud to form a film cooling layer along the shroud's inner surface. However, further improvements in thermal management of turbine casings could still be made.

BRIEF DESCRIPTION OF THE INVENTION

Aspects and advantages of the invention will be set forth in part in the following description, or may be obvious from the description, or may be learned through practice of the invention.

According to certain aspects of the disclosure, a thermal control method is provided for a gas turbine casing including an inner casing arranged around a central axis, the inner casing defining an opening therethrough in communication with an interior of the gas turbine, and an outer casing arranged around the inner casing. The method may include supplying thermal control gas from a compressor to a space between the outer casing and the inner casing, and transferring the thermal control gas from the space through the opening in the inner casing via a plurality of holes defined through a plate attached to an outer surface of the inner casing. The holes are arranged with a predetermined non-uniform distribution corresponding to a desired preferential impingement pattern for providing non-uniform heat transfer. Various options and modifications are possible.

According to other aspects of the disclosure, a gas turbine casing assembly may include an inner casing arranged around a central axis, the inner casing defining an opening therethrough in communication with an interior of the gas turbine and an outer casing arranged around the inner casing. Structure provides preferential heat transfer from the inner casing during operation of the gas turbine via a thermal control gas flow path from radially outside of the inner casing into the interior of the gas turbine. Again, various options and modifications are possible.

According to other aspects of the disclosure, a gas turbine includes a compressor section, a combustion section downstream from the compressor section, and a turbine section downstream from the combustion section. The turbine section includes an inner casing arranged around a central axis, the inner casing defining an opening therethrough in communication with an interior of the turbine section, an outer casing arranged around the inner casing, and means for providing preferential heat transfer from the inner casing during operation of the gas turbine via a thermal control gas flow path from radially outside of the inner casing into the interior of the gas turbine. As noted above, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

The detailed description explains embodiments of the invention, together with advantages and features, by way of example with reference to the drawings.

Figure 1:
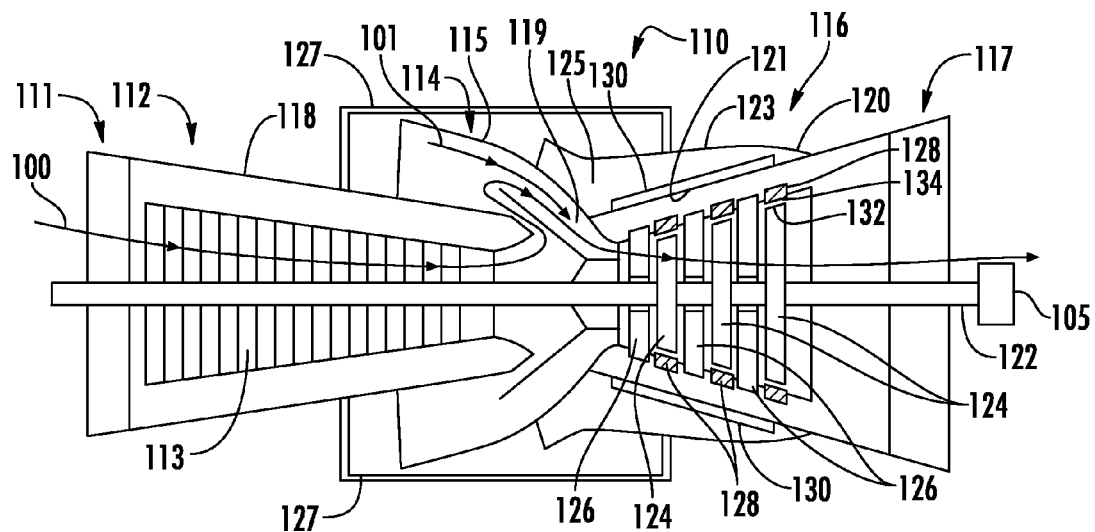
FIG. 1 is a cross-sectional schematic view of a gas turbine.

FIG. 1 schematically illustrates an embodiment of a gas turbine 110. The gas turbine includes an inlet section 111, a compressor section 112, a combustion section 114, a turbine section 116, and an exhaust section 117. A shaft 122 may be common to compressor section 112 and turbine section 116 and may be further connected to a generator 105 for generating electricity.

The compressor section 112 may include an axial flow compressor in which a working fluid 100, such as ambient air, enters the compressor from the inlet section 111 and passes through alternating stages 113 of stationary vanes and rotating blades (shown schematically in FIG. 1). Compressor casing 118 contains working fluid 100 as the stationary vanes and rotating blades accelerate and redirect the working fluid to produce a continuous flow of compressed working fluid. The majority of the compressed working fluid flows downstream through the combustion section 114 and then the turbine section 116.

The combustion section 114 may include any type of combustor known in the art. A combustor casing 115 may circumferentially surround some or all of the combustion section 114 to direct the compressed working fluid 100 from the compressor section 112 to a combustion chamber 119. Fuel 101 is also supplied to the combustion chamber 119. Possible fuels include, for example, one or more of blast furnace gas, coke oven gas, natural gas, vaporized liquefied natural gas (LNG), hydrogen, and propane. The compressed working fluid 100 mixes with fuel 101 in the combustion chamber 119 where it ignites to generate combustion gases having a high temperature and pressure. The combustion gases then enter the turbine section 116.

In turbine section 116, sets of rotating blades (buckets) 124 are attached to shaft (rotor) 122, and sets of stationary blades (vanes) 126 are attached to the turbine section casing 120. As the combustion gases pass over the first stage of rotating blades 124, the combustion gases expand, causing the rotating blades 124 and shaft 122 to rotate. The combustion gases then flow to the next stage of stationary blades 126 which redirect the combustion gases to the next stage of rotating buckets 124, and the process repeats for the following stages until the combustion gases exit turbine section 116 via exhaust section 117.

Gas turbine 110 as schematically illustrated is a single shaft, single cycle turbine. However, it should be understood that such illustration is for convenience only; the present disclosure can be employed with two shaft turbines, combined cycle turbines, etc. Therefore, no limitation of the invention is intended by the turbine illustrated schematically in FIG. 1 and described above.

Figure 2:
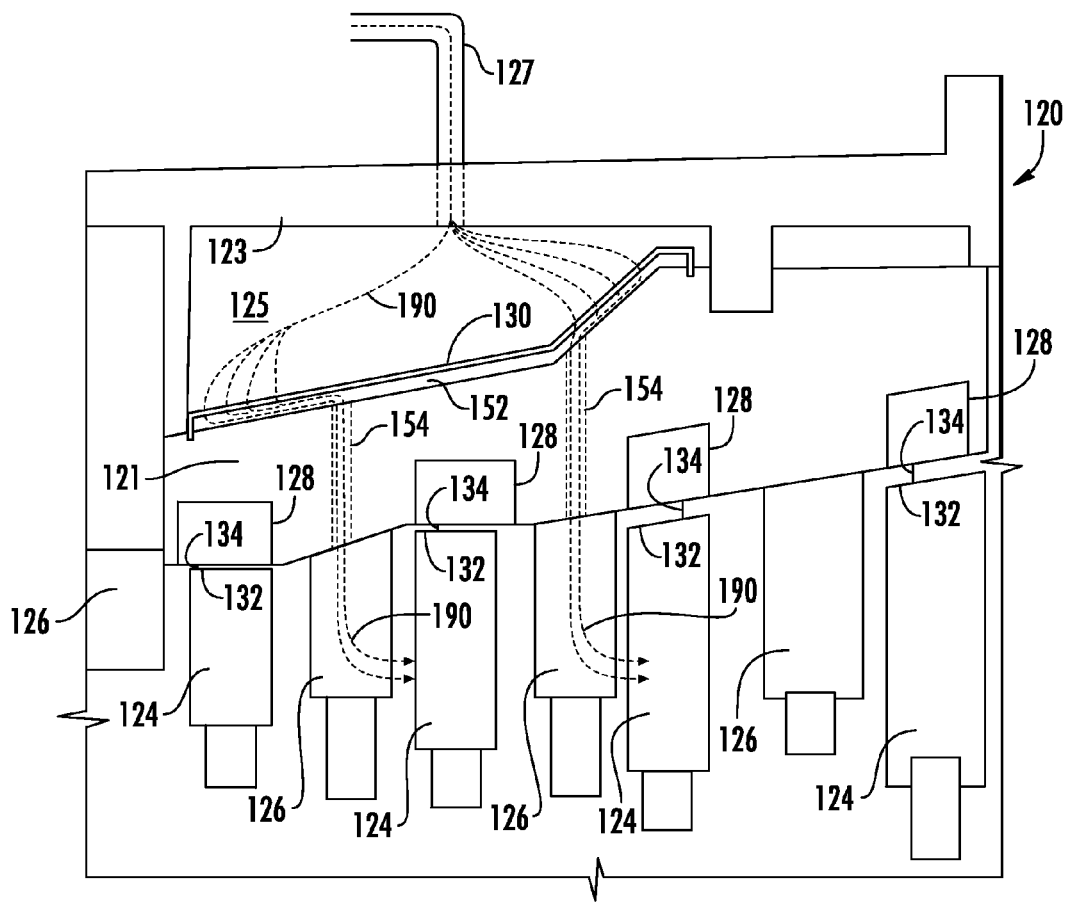
FIG. 2 is a cross-sectional schematic view of a portion of the gas turbine of FIG. 1.

Referring to FIGS. 1 and 2, turbine casing 120 may comprise an inner casing 121 and an outer casing 123 defining a space 125 therebetween in communication with compressor 112 via at least one passageway 127. At least one circumferential shroud 128 may be affixed to the interior surface of the inner casing 121 opposing tips 132 of a set of buckets 124. Shrouds 128 may be positioned proximate tips 132 of rotating turbine blades 124 to minimize air leakage past the blade tips. The distance between each blade tip 132 and the corresponding shroud 128 is referred to as the clearance 134. It is noted that clearances 134 of each turbine stage may not be consistent, in part due to the different thermal growth characteristics of blades 124 and casing 120 during operation of the gas turbine 110.

A contributor to the efficiency of gas turbines is the amount of air/exhaust gas leakage through the blade tip to casing shroud clearance 134. Due to the different thermal growth characteristics of turbine blades 124 and turbine casing 120, and forces created by rotation of the blades, clearances 134 can significantly change as the turbine transitions through transients from ignition to a base-load steady state condition.

Figure 3:
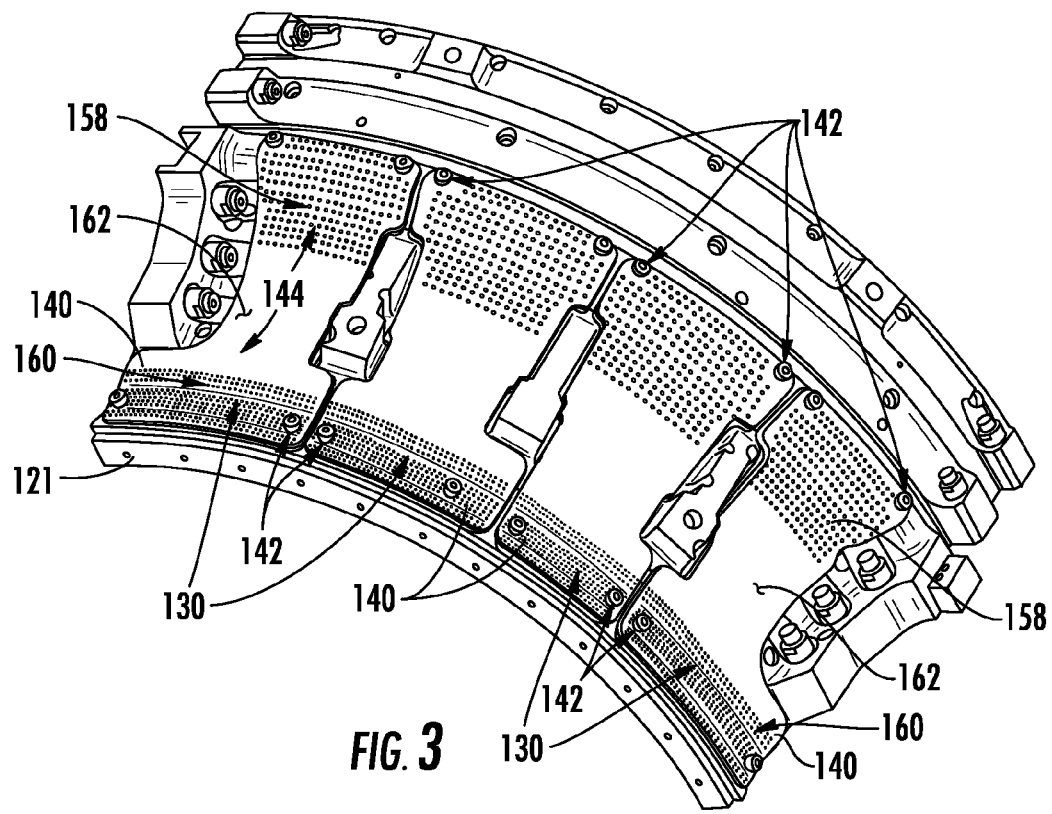
FIG. 3 is a perspective view of an outer portion of the inner casing of the gas turbine of FIG. 1 showing a plurality of thermal control sleeves attached to the inner casing.
Figure 4:
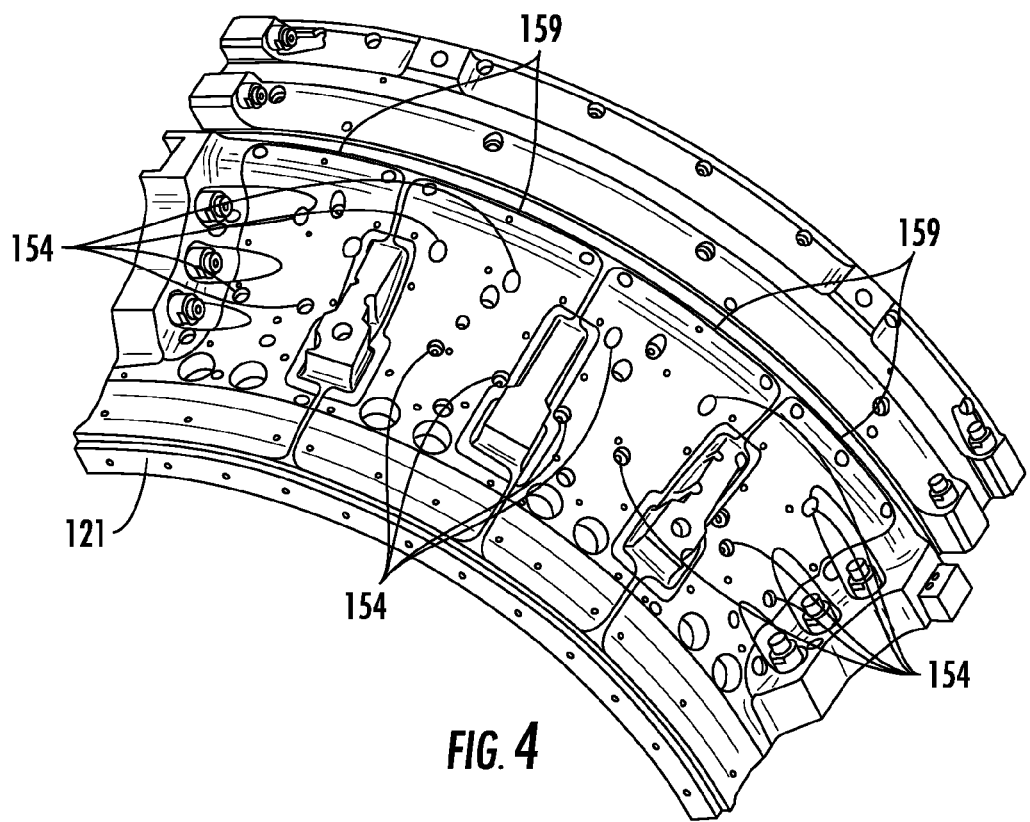
FIG. 4 is a perspective view of the gas turbine inner casing as in FIG. 3 with the thermal control sleeves removed.
Figure 5:
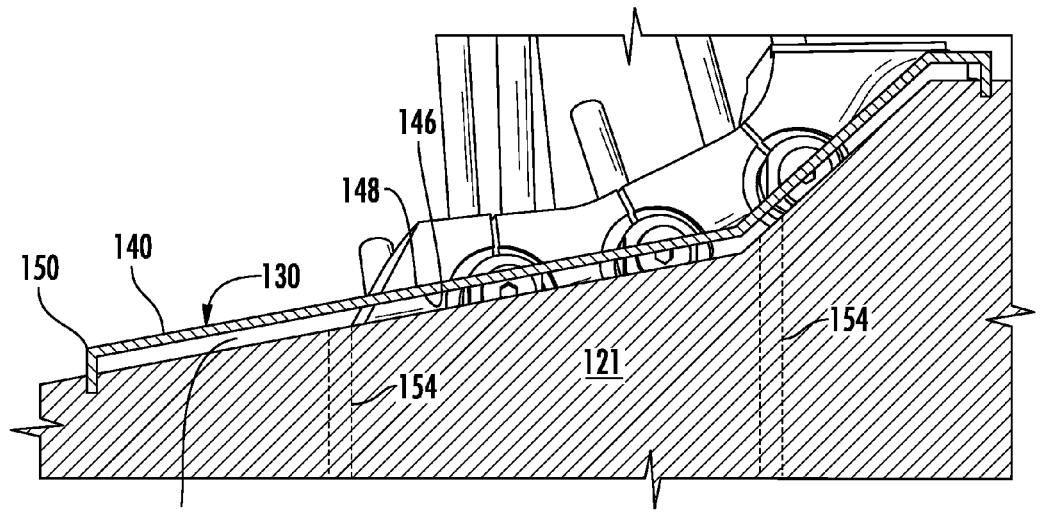
FIG. 5 is a cross-sectional schematic view of the portion of the gas turbine shown in FIG. 3 showing the thermal control sleeves attached to the inner casing.
Figure 6:
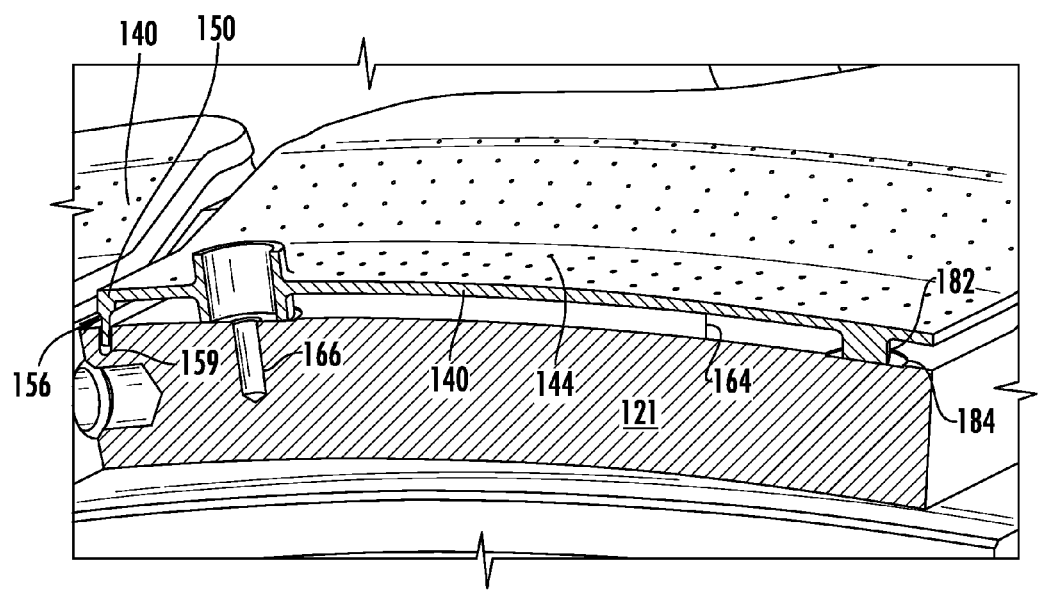
FIG. 6 is a cross-sectional view of a portion of the attachment between the thermal control sleeve and the inner casing.

As illustrated in FIG. 3, one or more thermal control sleeves 130 may be used to selectively heat or cool turbine inner casing 121 and thereby assist in the maintenance of a desired clearance 134 between respective turbine shrouds 128 and opposing blade tips 132. The thermal control sleeves 130 may each comprise a plate 140 configured for attachment to inner casing 121 via one or more mount assemblies 142. Plates 140 have a preferentially distributed array of holes 144 extending therethrough from an inner surface 146 oriented radially inward toward shaft 122 opposing inner casing 121 and an outer surface 148 oriented radially outward away from the inner casing toward space 125 and outer casing 123. Holes 144 may be arranged in plate 140 in a generally non-uniform manner (for example, in terms of size and/or distribution) that allows greater convective heat transfer from casing 120 in certain areas than in others. If desired, the areas of casing 120 that are subject to greater heat transfer could be areas that experience a higher temperature than experienced by other areas during operation, areas that have a higher mass, areas that have a lower heat transfer coefficient, etc. Accordingly, by arranging holes 144 in a predetermined fashion according to expected, calculated or empirically measured temperature distributions or transfer rates on casing 120 (with or without thermal control sleeves or any other heat management device present), one can achieve a differential thermal control of portions of inner casing 121 that are at different temperatures. In doing so, the temperature distribution across inner casing 121 in and around the areas where thermal control sleeves are mounted can be maintained in a more uniform state during operation, thereby avoiding or minimizing issues noted above when such temperatures are not maintained as uniformly as desired.

In the exemplary embodiment of FIG. 3, a plurality (e.g., 32) of thermal control sleeves 130 could be affixed about the circumference of the turbine inner casing 121, for example in eight groups of four. However, various other numbers and arrangements of sleeves 130 are possible. Further, the number and arrangement would vary depending on the particular size and configuration of the casing 120. Also, it should be noted that the number and arrangement of plates 140 on inner casing 121 may be dependent on the configuration of the inner casing, and that the plates need not be identical.

If desired, edges 150 of plates 140 may be partially or entirely sealed at an interface 156 with inner easing 121 so that air flow from the area 152 between the plates and the casing can only escape via holes 154 into the turbine interior, rather than by flowing around edges 150 of the plates. In such a case, a sealing interface 156 may extend partially or entirely around plates 140. Such a sealing interface 156 may have various forms, such as an interlocking flange 157 within a slot 159 in turbine inner casing, with or without a separate seal member, etc. Use of a sealing interface 156 can assist in controlling the thermal management of inner casing 121 so that it occurs substantially or completely via flow through holes 144 and 154 and/or occurs substantially via impingement.

Holes 144 may be positioned in an array. In an exemplary embodiment, the holes 144 may be spaced from each other in the range from about 0.1 to 2.0 inches, and individual holes 144 may be sized between about 0.025 and 0.250 inches. Thus a variety of hole sizes and densities is possible between plates or within a given plates. As shown in FIG. 3, holes 144 in each plate 140 are distributed in a first grouping 158 with a first hole arrangement spaced from a second grouping 160 with a second hole arrangement. Central area 162 of plate 140 has relatively fewer holes 144 (in this case none). The first and second hole arrangements may be identical, similar or different in terms of hole size and spacing. The varying hole sizes and spacing compensate for the non-uniformity of the geometry of the turbine inner casing 121 area beneath plate 140 and the nonuniformity of temperature and/or heat transfer from the turbine casing area. The size and positioning of the holes 144 (or lack thereof) on the plate 140 produces a preferential heat transfer coefficient across inner casing 121. Accordingly, in the example shown, more heat transfer would occur from the portions of inner casing 121 near groupings 158 and 160 than beneath central area 162. However, it should be understood that the arrangements, sizes, spacing, density, etc. of holes 144 should not be limited by the disclosure above, and can be fine-tuned in various ways in view of the operation parameters and geometrical configuration of a particular 116 turbine and its casing 120.

The gap 164 between each plate 140 and inner casing 121 affects the heat transfer coefficient. In one embodiment, gap 164 is such that heat transfer occurs substantially via impingement cooling (perpendicular flow onto the surface of inner casing 121, rather than ducting across the surface). Too large of a gap can result in an undesirably low heat transfer coefficient where the heat transfer is substantially via ducting. Too little of a gap can result in both an undesirable and a non-uniform heat transfer coefficient. In an exemplary embodiment, a gap 164 of between about 0.1 and 2.0 inches provides a suitable heat transfer coefficient. However, gap 164 is not limited to this range and may be any distance that provides a suitable heat transfer coefficient. Also, it should be understood that gap 164 need not be uniform across the entire plate 140 or from plate to plate. Gap 164 can accordingly vary to match the casing shape, mass, temperature distribution, etc., as desired.

By maintaining gap 164 in the desired range, with the pressures experienced by a gas turbines and using gas extracted from compressor 112, impingement cooling can be achieved through substantially perpendicular flow through holes 144 in plates 140 onto the outer surface of inner casing 121. (See flow path 190 from space 125 through plate 140 into space 152, and through inner casing 121 into (and eventually out of) blades 126). By placement of holes 144 in desired locations and densities, with desired dimensions, a preferentially located heating or cooling of inner casing 121 can be achieved. In other words, inner casing 121 can have heat transferred to or from it in a non-uniform fashion, as dictated by the plate and hole designs. This arrangement can vary in different turbines, in different plates within the same turbine, in different installation locations of the same turbine, or in other ways. Thus, the hole arrangement can be made to accommodate a variety of desired heat transfer coefficients on the outer surface of the casing, in view of particular applications and functions in a given turbine. The design and the use of plates 140 are therefore flexible, providing benefits in many applications.

During start-up the extracted compressor gases will actually be warmer than inner casing 121. Therefore, during wind up until a steady state is achieved, the preferential thermal control achieved would be substantially the heating of the impinged areas of casing 121 opposing holes 144. At some point during wind-up and/or once steady state is achieved the extracted compressor gas will function to cool the impinged area. Accordingly, plates 140 can be considered preferential thermal control devices, operating at least substantially according to impingement rather than ducting, to heat or cool impinged areas of inner casing 121.

Figure 7:
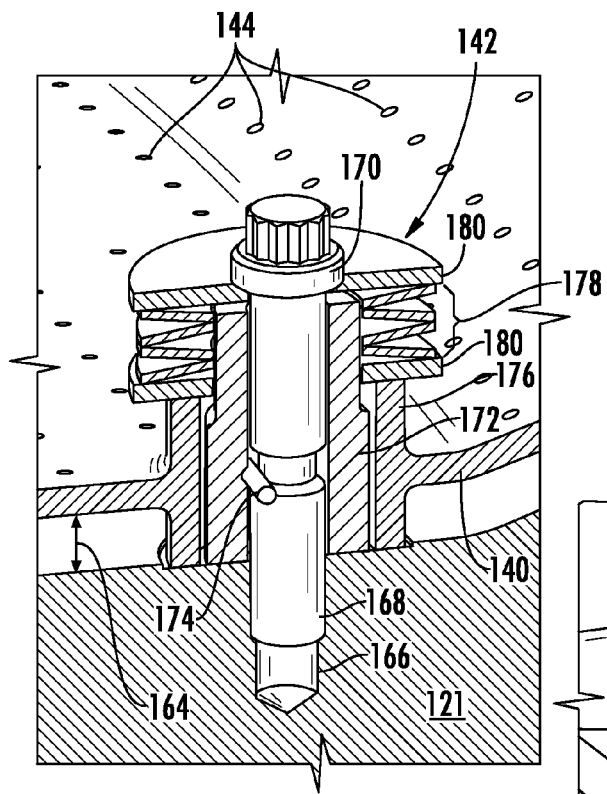
FIG. 7 is a perspective view of a mount assembly for a thermal control sleeve.
Figure 8:
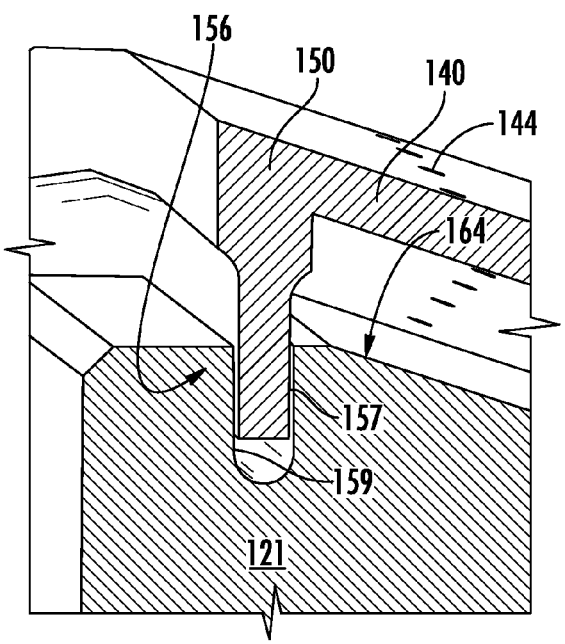
FIG. 8 is a cross-section of a lip of a thermal control sleeve mating with a groove in the inner casing.
Figure 9:
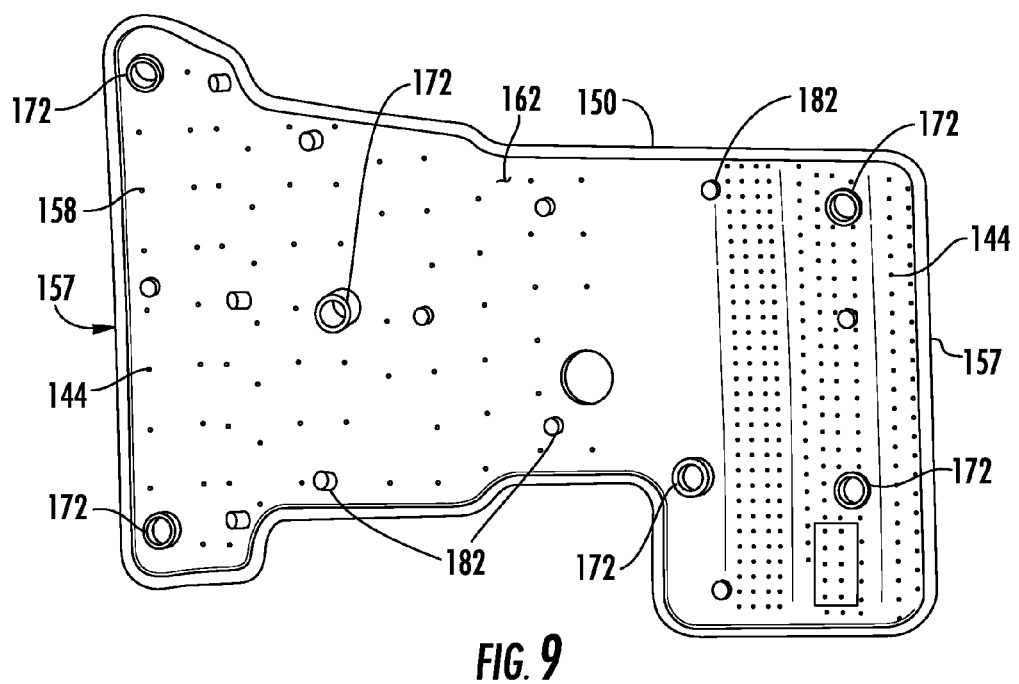
FIG. 9 is a bottom view of a thermal control sleeve.

Referring to FIG. 7, mount assemblies 142 can be used to provide an adjustment of the gap distance between plate 140 and turbine inner casing 121. As shown, mounts 142 function to hold or support the plates 140 (in particular, the holes 144) at a predetermined gap distance 164 from the surface of the turbine inner casing 121. Mounts 142 may also allow plates 140 to float at or near a desired height over the sections of inner casing 121 as the casing diameter changes during operation of the turbine. Mount assemblies 142 may also or alternatively include a floating feature so that thermal and rotational expansion and contraction of turbine inner casing 121 can be accounted for during operation. That is, a spring loaded, slidable or other adjustable feature may be provided allowing plates 140 and inner casing 121 to float relative to one another so that the gap may vary automatically, for example, if the diameter of inner casing 121 grows during operation of turbine 116.

Mount 142 may comprise an assembly of various components that include a threaded bore 166 in inner casing 121, a helicoil 168 in the bore, and a threaded member such as a screw 170 in the helicoil. A bushing 172 is located around helicoil 168, and held in place by a pin 174. Bushing 172 fits within a circular flange 176 in plate 140 alignable with bore 166. Belleville springs 178 are held between two washers 180. This arrangement beneficially allows for some float between plate 140 and inner casing 121 during use of the turbine. However, other mounting structures could be used or substituted.

Mount assembly 142 therefore provides for improved plate 140 to inner casing 121 gap distance control and reduces the installation time when the plates are mounted to the casing, both during the initial fit-up and during subsequent re-installations. Relatively improved and tighter tolerances during the re-installations may also be maintained by the mounts 142. Spacers 182 may be provided on plate bottom surfaces 146 to assist in maintaining the desired gap 164. Spacers may contact indentations 184 on inner casing if desired, to ensure proper location.

The present disclosure is also directed to a related method of thermal control of a turbine casing that may include supplying compressor-extracted gas to a space outside a turbine inner casing and transferring the gas through holes in a plate attached to the outer casing. The holes are arranged with a predetermined non-uniform distribution to achieve a desired heat transfer via impingement on the inner casing surface. The method can be used to heat or cool the inner casing, and can be used during start-up or steady state operation. The plate and the hole distribution can also be considered at least a part of a means for providing preferential heat transfer with reference to the outer casing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A thermal control method for a gas turbine casing of a gas turbine including an inner casing arranged around a central axis, the inner casing defining an opening therethrough in communication with an interior of the gas turbine, and an outer casing arranged around the inner casing, the method including:
   supplying thermal control gas from a compressor to a space defined between the outer casing and the inner casing; and
   transferring the thermal control gas from the space into a cavity and from the cavity through the opening in the inner casing, wherein the cavity is defined between a plate and an outer surface of the inner casing, the plate being attached to an area of the inner casing and having a first surface opposing the outer surface of the inner casing and a second surface opposite the first surface, wherein the plate further comprises a flange that extends radially inwardly from the first surface towards the inner casing and entirely about a perimeter of the plate, wherein a plurality of holes are defined through the plate from the first surface to the second surface, wherein the plurality of holes is arranged with a predetermined non-uniform distribution in the plate corresponding to a desired preferential impingement pattern for providing non-uniform heat transfer from the area during operation of the gas turbine so as to control a temperature of the inner casing across the area, wherein the flange is disposed within a slot defined within the outer surface of the inner casing forming a seal between the outer surface of the inner casing and the flange.

2. The method of claim 1, wherein the thermal control gas cools the inner casing.

3. The method of claim 2, wherein the thermal control gas is supplied during steady state operation of the gas turbine.

4. The method of claim 1, wherein the predetermined non-uniform distribution includes providing two or more holes of the plurality of holes having different sizes in different portions of the plate.

5. The method of claim 1, wherein the predetermined non-uniform distribution includes arranging the plurality of holes such that different portions of the plate comprise differing densities of holes of the plurality of holes.

6. The method of claim 5, wherein a first portion of the plate includes a first subset of holes of the plurality of holes arranged with a first density and a second portion of the plate includes a second subset of holes of the plurality of holes arranged with a second density different from the first density.

7. The method of claim 1, wherein the plate has two ends and a middle portion between the two ends, the predetermined non-uniform distribution including providing a higher density of holes proximate at least one of the two ends than in the middle portion.

8. The method of claim 1, wherein the plate has two ends and a middle portion between the two ends, the predetermined non-uniform distribution including providing at least one first hole of the plurality of holes which is larger than at least one second hole of the plurality of holes wherein the at least one first hole is formed proximate to at least one of the two ends.

9. The method of claim 1, wherein the thermal control gas heats the inner casing.

10. The method of claim 9, wherein the thermal control gas is supplied during start-up operation of the gas turbine.

* * * * *